United States Patent [19]

Fukada et al.

[11] Patent Number: 5,062,496

[45] Date of Patent: Nov. 5, 1991

[54] STRUCTURE FOR MOUNTING AIR CLEANER OF ENGINE

[75] Inventors: Hirotaka Fukada; Koichi Kondoh, both of Hiroshima; Tsuyoshi Tsuchida, Yamaguchi, all of Japan

[73] Assignee: Mazda Motor Corporation, Japan

[21] Appl. No.: 385,346

[22] Filed: Jul. 25, 1989

[30] Foreign Application Priority Data

Jul. 29, 1988 [JP] Japan .................................. 63-101202

[51] Int. Cl.⁵ .............................................. B60K 5/12
[52] U.S. Cl. .................. 180/291; 123/198 E; 180/68.3; 180/297; 180/313
[58] Field of Search ................ 123/198 E; 74/606 R; 180/68.3, 291, 297, 312, 313

[56] References Cited

U.S. PATENT DOCUMENTS

| | | | |
|---|---|---|---|
| 3,802,169 | 4/1974 | Mugford | 55/484 |
| 4,354,458 | 10/1982 | Bury | 123/52 M |
| 4,487,287 | 12/1984 | Watanabe | 180/297 |
| 4,533,012 | 8/1985 | Komoda | 180/68.3 |
| 4,562,800 | 1/1986 | Tsujibayashi | 123/195 A |
| 4,685,531 | 8/1987 | Kopich | 180/300 |
| 4,809,799 | 3/1989 | Ozaki et al. | 180/312 |

FOREIGN PATENT DOCUMENTS

| | | |
|---|---|---|
| 2138950 | 2/1973 | Fed. Rep. of Germany . |
| 58-29158 | 8/1981 | Japan . |
| 63-14428 | 1/1988 | Japan . |

*Primary Examiner*—Andres Kashnikow
*Assistant Examiner*—Eric Culbreth
*Attorney, Agent, or Firm*—Thompson, Hine and Flory

[57] ABSTRACT

A structure for mounting an air cleaner in an engine compartment. The air cleaner is supported on an engine and a transmission having different vibration frequencies. Therefore, the frequency of an applied vibration force does not coincide with the natural frequency of the air cleaner, with the result that resonance of the air cleaner is prevented and reliability of the air cleaner is improved.

15 Claims, 4 Drawing Sheets

STRUCTURE FOR MOUNTING AIR CLEANER OF ENGINE

BACKGROUND OF THE INVENTION (a) Field of the Invention

The present invention relates to a structure for mounting an air cleaner near an engine.

(b) Description of the Prior Art

It is sometimes difficult to mount an air cleaner on an engine. For example, in an engine with a fuel injection system, the fuel injector system and an air duct are mounted on the engine and the air cleaner is mounted on the vehicle body. The air cleaner and duct which introduces fresh air to it are mounted on the vehicle body and engine respectively using a rubber mounting and are connected through a rubber hose, as disclosed by the Japanese Utility Model Laying Open Gazette No. 63-14428.

In another application, an air cleaner is arranged in the empty space above the transmission to reduce the size required for the engine compartment, as disclosed by the Japanese Utility Model Publication Gazette No. 61-28041. Here, engine vibration is prevented from being transferred to the vehicle body because the air cleaner is mounted on the engine. However, the air cleaner receives vibration from the engine and when this vibration frequency coincides with the natural frequency of the air cleaner, the air cleaner resonates, possibly reducing the reliability of the air cleaner.

In a specific example, an air flow meter used to control engine operation is provided on the air cleaner. Where this air flow meter is a hot wire type system, the fine hot wire could break due to the vibration of the engine. In an air cleaner made of a resin, the air cleaner resonates when the engine vibration is approximately 5000 rpm and this could cause the hot wire to break.

The configuration of the air cleaner can be changed, but this only shifts the resonance point and does not substantially solve the air cleaner resonance problem.

SUMMARY OF THE INVENTION

It is an object of the present invention to prevent the resonance of an air cleaner by devising a support structure for the air cleaner when the air cleaner is mounted near an engine and a transmission.

In order to attain the aforementioned object, according to the present invention, the air cleaner is attached so that it is supported by both the engine and the transmission.

In the above construction in accordance with the present invention, vibration is transferred from both engine and transmission to the air cleaner.

In this case, since the vibration frequencies of the engine and the transmission are different, the frequency of the applied vibration force does not coincide with the natural frequency of the air cleaner, with the result that air cleaner resonance is prevented and reliability is improved.

BRIEF DESCRIPTION OF THE DRAWINGS

The nature and advantage of the present invention will be made more apparent from the following description made with reference to the accompanying drawings, in which.

DETAILED DESCRIPTION OF THE PREFERRED EMBODIMENT

Embodiments of the present invention will be explained below with reference to the accompanying drawings.

Figure 1:
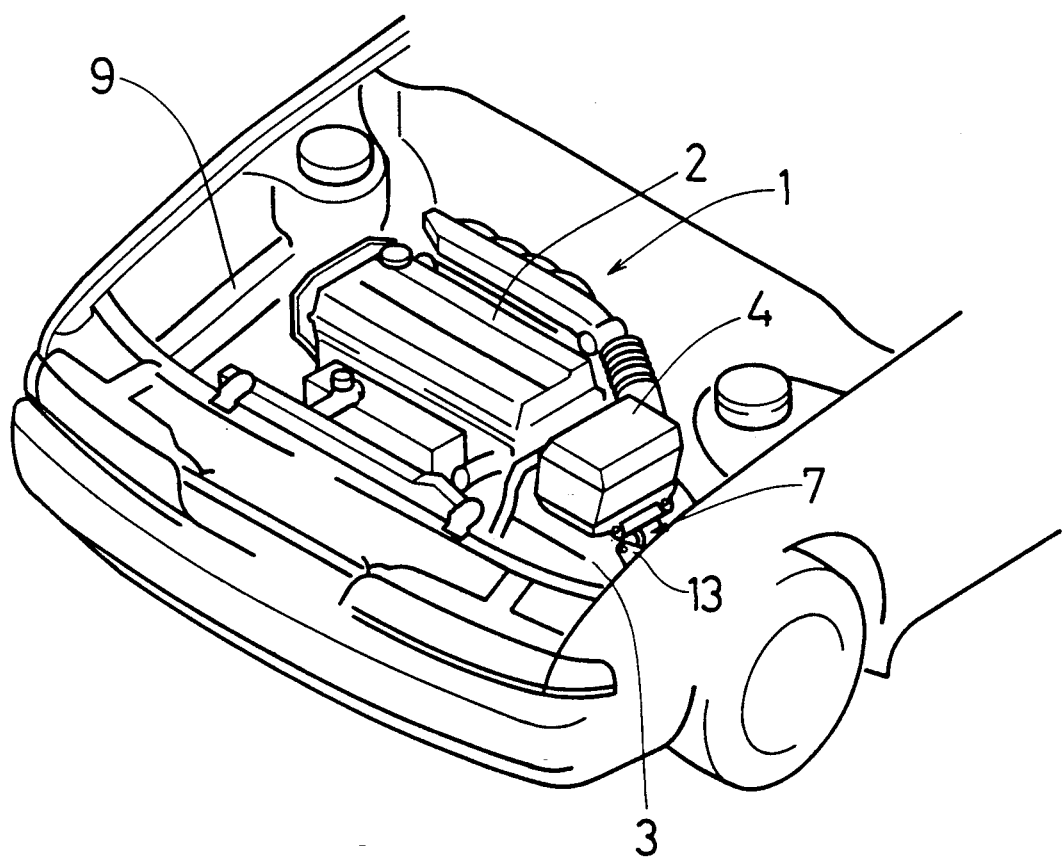
FIG. 1 is a perspective view showing an engine compartment of a motor vehicle.
Figure 2:
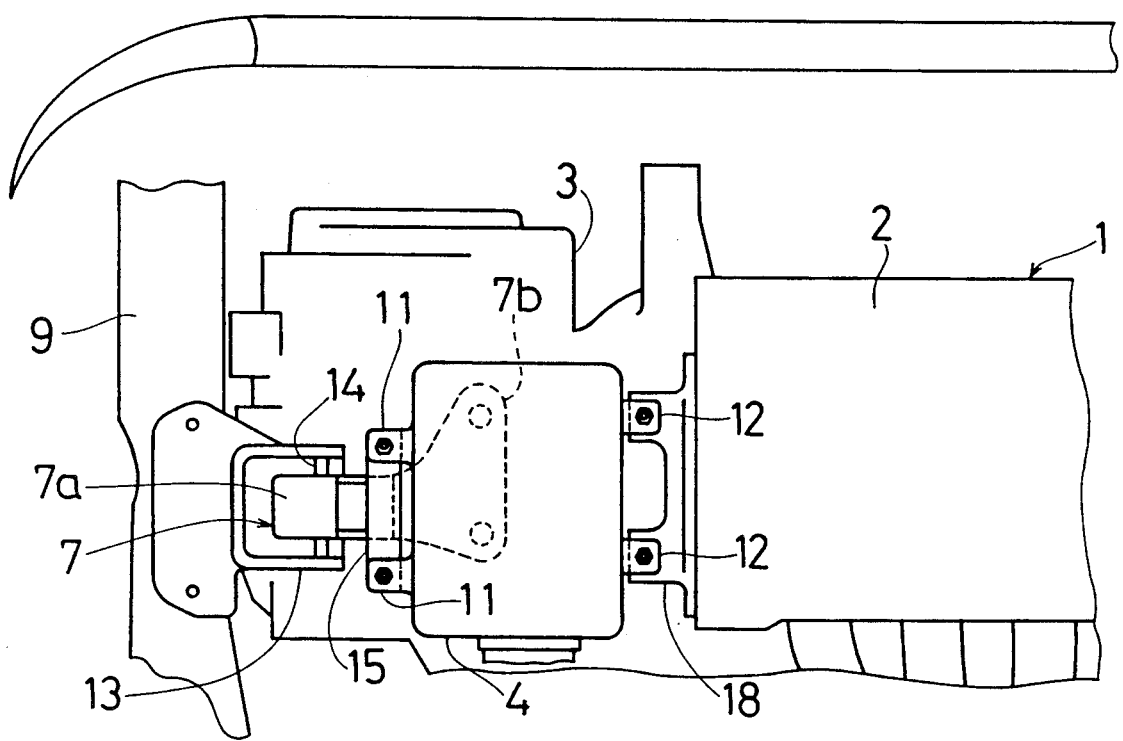
FIG. 2 is a top view showing a structure for mounting an air cleaner.
Figure 3:
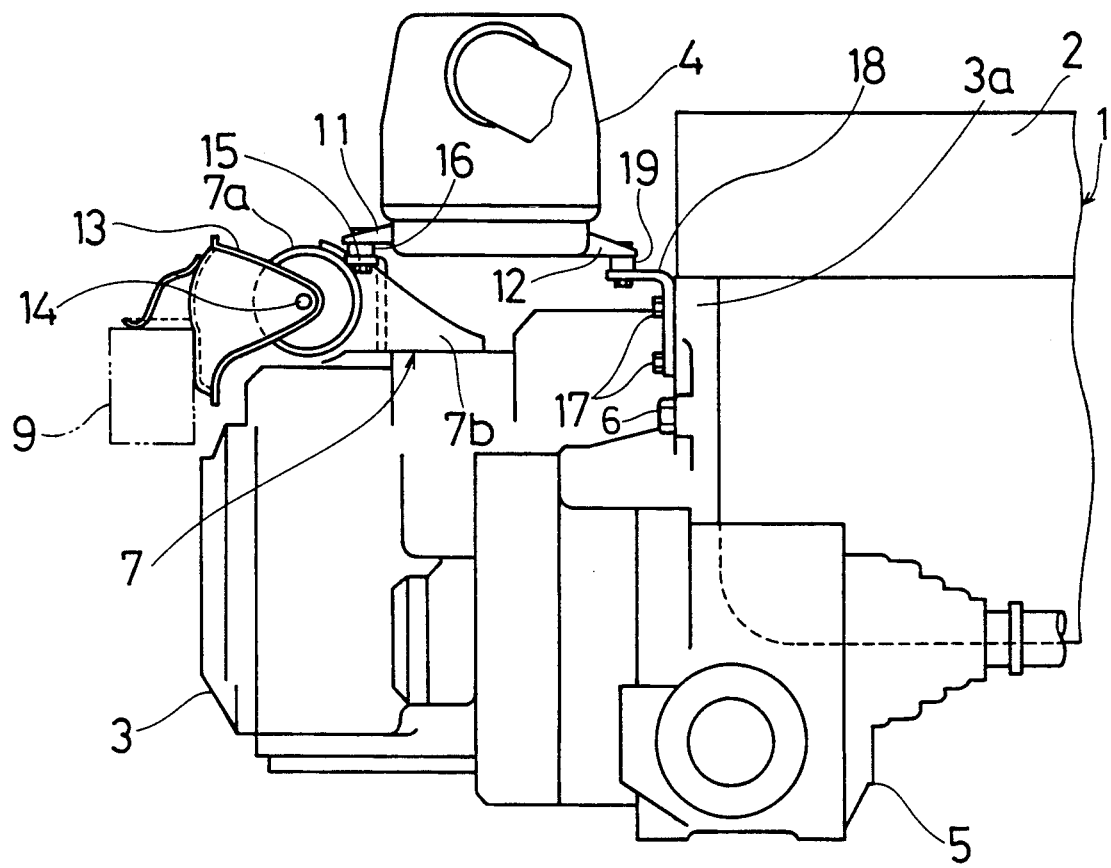
FIG. 3 is a front view showing the same.

In FIGS. 1 through 3, reference numeral 1 designates a power plant comprising an engine 2 and a transmission 3. The engine 2 is arranged such that in the engine compartment, a crank shaft parallels the vehicle bumper (a horizontal direction in FIG. 2). Reference numeral 4 designates an air cleaner which is arranged in a space adjacent to a transverse sides of the engine 2 and above the transmission 3. Reference numeral 5 designates a differential gear housing connected to the transmission 3. The transmission 3 has a flange 3a on its one end connected to the engine 2 along one of the transverse sides of the engine 2 by a bolt 6 and an upper end part on the other side connected to a frame member 9 of a vehicle body through a first bracket 7. This frame member 9 extends in a longitudinal direction of the vehicle (a vertical direction in FIG. 2) and forms one part of the side wall of the engine compartment.

Figure 4:
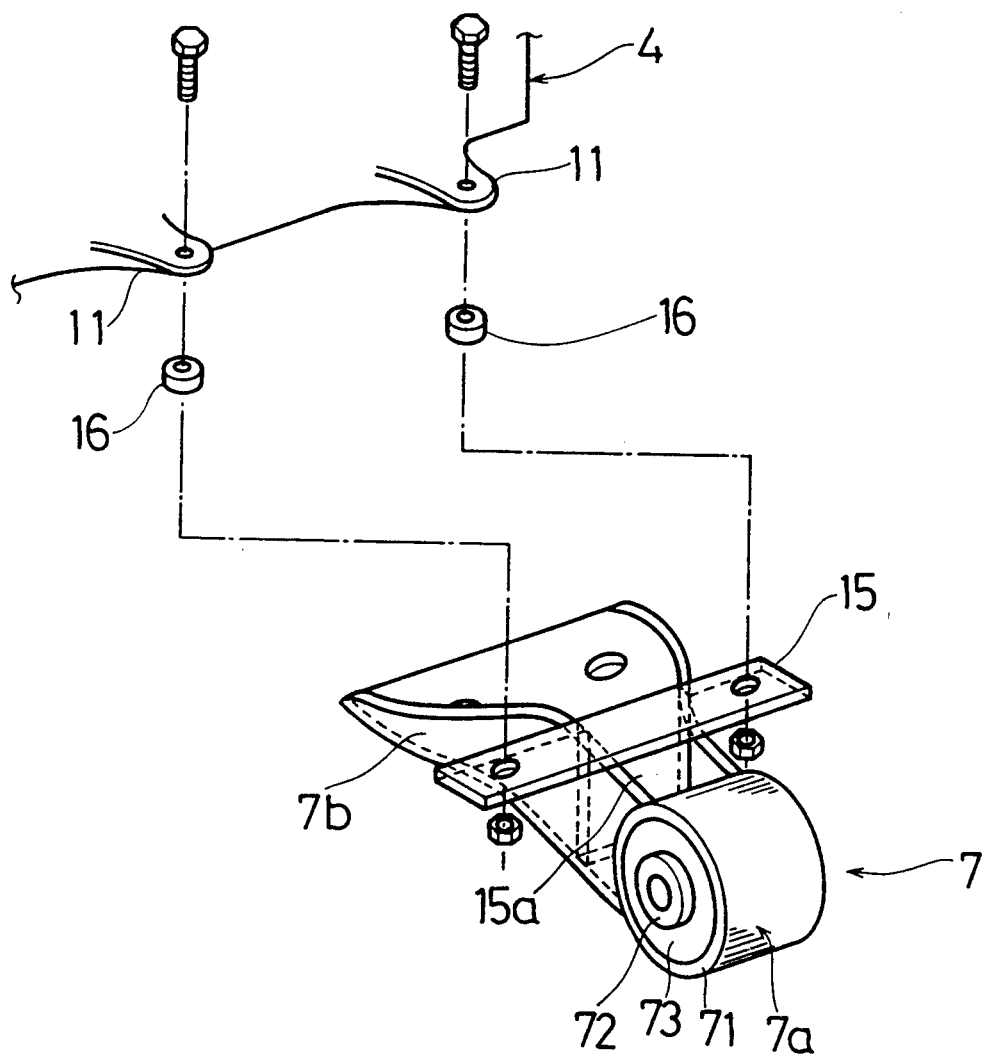
FIG. 4 is an exploded perspective view showing how the structure for mounting a mounting bracket is attached.

Referring to FIG. 4, the first bracket 7 comprises a cylindrical member 7a and a supporting member 7b having a U-shaped longitudinal section which is connected to the cylindrical member 7a and extends from the cylindrical member 7a toward the engine. The cylindrical member 7a comprises an external cylindrical member 71, an internal cylindrical member 72 provided in the external cylindrical member 71 so as to be concentric with the external cylindrical member 71 and a cylindrical rubber member 73 intervening between the two cylindrical members 71 and 72. Referring now to FIG. 2, a second bracket 13 having a U-shaped cross section is fixed in the frame member 9. The cylindrical member 7a of the first bracket 7 is supported on the second bracket 13 by a connecting shaft 14 inserted into the internal cylindrical member 72. In addition, the supporting member 7b of the first bracket 7 is connected to the upper surface of the transmission 3 by a bolt.

The air cleaner 4 comprises a hot wire type air flow meter. In addition, as shown in FIGS. 2 and 3, left flanges 11 project from the lower left of the air cleaner and right flanges 12 project from the lower right of the air cleaner.

A left supporting bracket 15 extending in a londitudinal direction of the vehicle body is welded to the supporting member 7b of the first bracket 7 as shown in FIG. 4. More specifically, the left supporting bracket 15 has a part 15a extending in a vertical direction and a side end of this part 15a is welded to the supporting member 7b. The left flanges 11 are mounted on the upper surface of the left supporting bracket 15 by bolts through a rubber elastic mounting member 16. More specifically, the air cleaner 4 is mounted to the transmission 3 by the flanges 11 through the left supporting bracket 15 and the mounting bracket 7.

Referring to FIGS. 2 and 3, a right supporting bracket 18 is mounted on the engine 2. The bracket 18 is connected to the engine 2 by insertion of bolts 17 through the flange 3a of the transmission 3. The right flanges 12 are mounted on the upper surface of the right supporting bracket 18 by bolts through a rubber mounting member 19. More specifically, the air cleaner 4 is mounted on the engine 2 by the flanges 12 through the right supporting bracket 18.

Therefore, in the aforementioned structure for mounting the air cleaner 4, the vibration of the engine 2 is transferred to the air cleaner 4 through the right supporting bracket 18 while the motor vehicle is running. Also, the vibration of the transmission 3 is transferred to the air cleaner 4 through the left supporting bracket 15 and the first bracket 7. Since the vibration of the engine 2 and the vibration of the transmission 3 have different vibration frequency characteristics, the frequency of the applied vibration force does not coincide with the natural frequency of the air cleaner 4 with the result that resonance of the air cleaner 4 is prevented and the reliability of the air cleaner 4 is improved.

The power plant 1 generates power plant bending (bending vibration). The air cleaner 4 is supported on the center section of the power plant 1 through the right supporting bracket 18 and supported on the end part of the power plant 1 through the left supporting bracket 15. Therefore, even when the power plant bending is generated, the air cleaner is prevented from receiving the vibration of the power plant 1 and resonating because the vibration input to the air cleaner 4 through both supporting brackets 15 and 18 have different characteristics.

Since the air cleaner 4 does not resonate in this way, the hot wire is prevented from breaking. As a result, it is possible to accurately measure a quantity of intake air by the air flow meter and normally control the engine 2.

In addition, since the air cleaner 4 is connected to the engine 2 and the transmission 3, the distance between supporting points of the air cleaner 4 is less than that required when the air cleaner 4 is connected to the engine 2 and the frame member 9, with the result that the air cleaner can be more stably mounted. Furthermore, since the air cleaner 4 is positioned on the transmission 3 and the distance between the supporting points is short, it is possible to reduce the height of the hood by effectively using a limited space in the engine compartment.

The present invention is not limited to the structure in the aforementioned embodiment. Although the air cleaner is supported at two places in the above embodiment, it may be supported on the power plant or the vehicle body at another place in addition to these two places in order to increase mounting stability.

What is claimed is:

1. An assembly for mounting an air cleaner to an automobile power plant having an engine and a transmission, comprising:

first, means mounting said air cleaner to a portion of said power plant which is substantially vibrated by said engine;

second means mounting said air cleaner to a portion of said power plant which is substantially vibrated by said transmission; and frame member mounting means for connecting said second mounting means to an associated vehicle body, said frame member mounting means including first bracket means for connecting said frame member mounting means to said second mounting means, second bracket means for connecting said frame member means to said vehicle body, and means for connecting said first bracket means to said second bracket means, whereby vibration of said air cleaner at a natural frequency thereof by said power plant is prevented.

2. The assembly of claim 1 wherein said second mounting means is connected to said first bracket means through elastic mounting members.

3. The assembly according to claim 1, wherein said first bracket means comprises:

a U-shaped supporting member connecting said air cleaner to said transmission;

an external cylinder connected to said supporting member;

an internal cylinder provided coaxially with said external cylinder and connected to said second bracket means; and resilient means for separating said external cylinder and said internal cylinder.

4. The assembly of claim 3 wherein said second mounting means comprises a flange connected to an upper portion of said supporting member means.

5. The assembly of claim 4 wherein said flange is mounted on said first bracket means through elastic mounting members.

6. An assembly for mounting an air cleaner to an automobile power plant of the type having an engine and a transmission, comprising:

first means mounting said air cleaner to a portion of said power plant which is substantially vibrated by said engine; and second means mounting said air cleaner to a portion of said power plant which is substantially vibrated by said transmission, said second mounting means including first bracket means mounted on said transmission, for supporting said air cleaner, and second bracket means, mounted on said vehicle body, for supporting said transmission, said first bracket means being connected to said second bracket means.

7. The assembly of claim 6 wherein said second mounting means includes resilient means for mounting said air cleaner to said first bracket means.

8. The assembly of claim 6 wherein said first bracket means is provided with cylindrical member means and support member means, said cylindrical member means having an external cylinder, an internal cylinder which is coaxial with said external cylinder, and resilient means positioned between said external and internal cylinders for connecting said external cylinder with said internal cylinder, said external cylinder being connected to said support member means, said internal cylinder being connected to said bracket means, and said support member means being U-shaped and mounted on said transmission.

9. The assembly of claim 8 wherein said second mounting means includes a supporting bracket mounted on said support member means of said first bracket means, said supporting bracket supporting a flange of said air cleaner.

10. The assembly of claim 9, wherein said second mounting means includes an elastic means for mounting said flange of said air cleaner to said supporting bracket.

11. A power plant of an automobile comprising:

an engine having a crank shaft arranged in parallel with a front bumper of said automobile;

a transmission connected to a transverse side of said engine;

an air cleaner disposed adjacent to said transverse side of said engine and above said transmission;

first means mounting said air cleaner to a portion of said power plant which is substantially vibrated by said engine; and second means mounting said air cleaner to a portion of said power plant which is substantially vibrated by said transmission, said second mounting means including first bracket means mounted on said transmission for supporting said air cleaner, and second bracket means, attached to said first bracket means, for mounting said transmission on a body of said automobile.

12. The power plant of claim 11 wherein said second bracket means is connected a side wall of an engine compartment of said automobile.

13. The power plant of claim 12 wherein said side wall connected to said second bracket means extends in a longitudinal direction of said automobile.

14. The power plant of claim 11 wherein said first mounting means includes a supporting bracket connected to a portion of said transmission attached to said engine.

15. The power plant of claim 14 wherein said first mounting means includes elastic means for mounting said air cleaner to said supporting bracket.

* * * * *